Sept. 22, 1936.   C. H. BECKWITH   2,055,449
OPERATING AND LUBRICATING MEANS FOR COCKS AND VALVES
Filed July 10, 1933   2 Sheets-Sheet 2
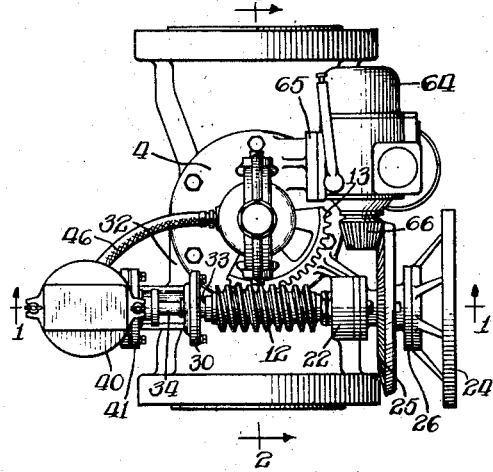
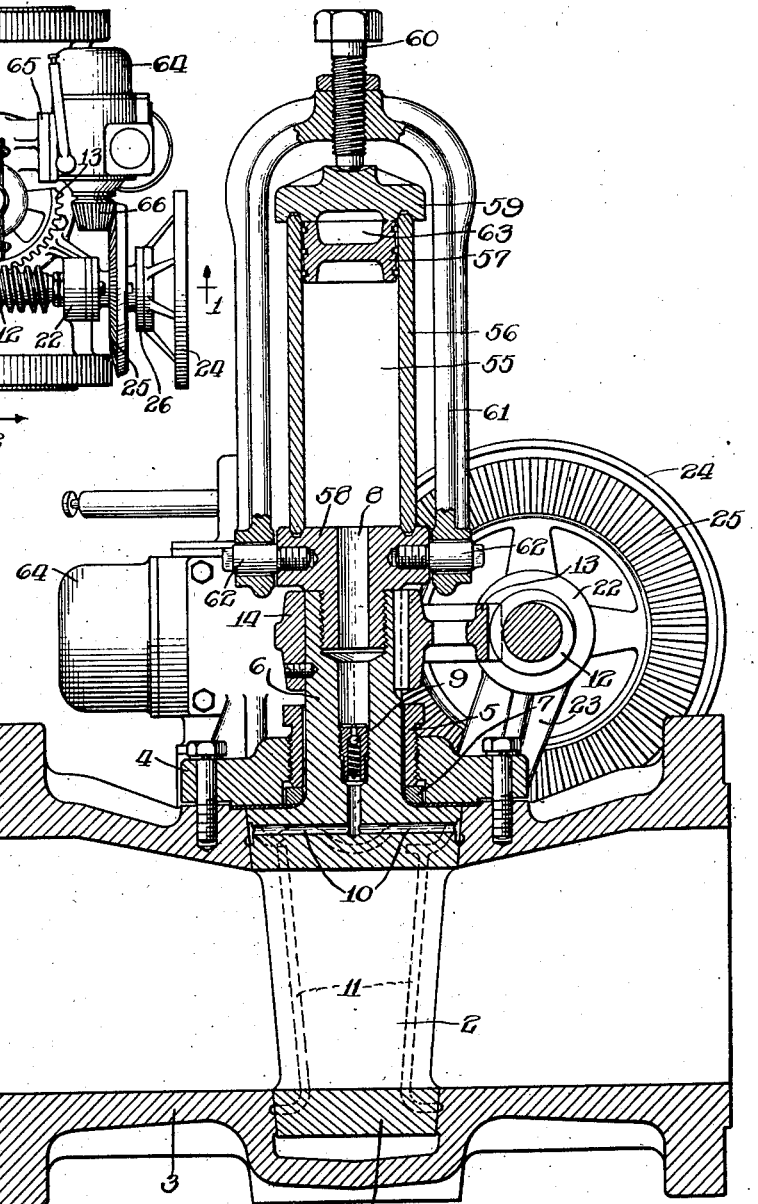
Inventor;
Clinton H. Beckwith.
By   Ira J. Wilson   atty Patented Sept. 22, 1936

2,055,449

UNITED STATES PATENT OFFICE 2,055,449

OPERATING AND LUBRICATING MEANS FOR COCKS AND VALVES

Clinton H. Beckwith, Geneva, Ill., assignor to Crane Co., Chicago, Ill., a corporation of Illinois Application July 10, 1933, Serial No. 679,614

24 Claims. (Cl. 251—93)

This invention provides a lubricated plug valve with means operable by means to turn the valve plug for forcing lubricant between the seating surfaces of the plug and its casing, whereby to obviate sticking of the plug and to render the valve readily operable without necessitating a previous hand manipulation of lubricant forcing means. In a general aspect, the invention comprises an operating and lubricating means applicable to various cocks and valves or other devices which are intended to be operated more or less occasionally and which are likely to stick after staying in one position a considerable period of time.

In the accompanying drawings,

Fig. 2 is a sectional view taken on the line 2—2 of Fig. 3, looking in the direction of the arrows.

Fig. 3 is a top plan view.

Figure 1:
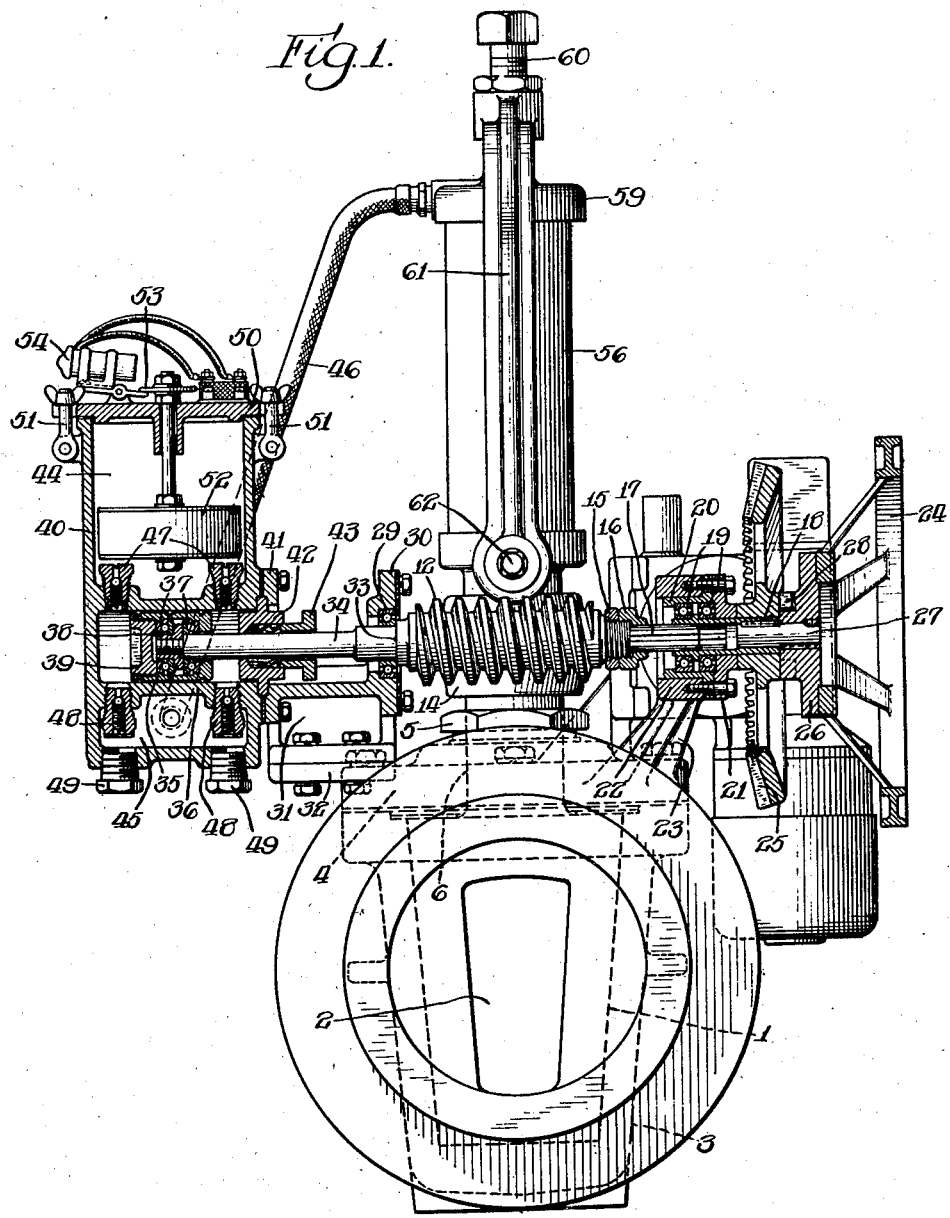
Fig. 1 is a front elevation with parts in section of an apparatus containing an embodiment of the invention.

The drawings represent a lubricated cock or plug valve of the type disclosed in U. S. patent to Flodin No. 1,875,302 of August 30, 1932. As shown in the drawings, the tapered valve plug 1 having a transverse port 2 is fitted in a correspondingly formed seat therefor in the valve casing 3 and is held seated therein by the bonnet 4 secured to said casing, a suitable gasket being clamped between said bonnet and the top of the valve plug. A tubular screw 5 through which the plug stem 6 extends is screwed into the bonnet against a thrust washer which is thereby forced against the top of the plug, said washer having lugs (not shown) cooperating one with a notch in the plug and the other with a recess in the bonnet to limit rotation of the plug to ninety degrees. In the position of the valve plug shown in Figs. 1 and 2, the port 2 of the plug establishes communication through the plug between the inlet and outlet passageways of the valve casing, such communication being shut off by the plug when turned to a position at right angles to the position shown.

For lubricating the seating surfaces of the plug and its casing, grease supplied to a receptacle or passage 8 in the plug stem may be conducted via the inwardly opening check valve 9 to radial ducts 10 communicating with suitable lubricant grooves 11. As in the Flodin patent, there are two lubricant grooves formed in the seating surface of the valve casing and extending substantially continuously around the fluid passage openings of said seating surface, so as to provide grease seals around said openings in both the closed and open positions of the valve. The two lubricant grooves are separate or unconnected with each other, so as to prevent the blowing out of the lubricant from the entire groove system as the valve plug is turned to and from open position. This is merely exemplary of one suitable means for conducting lubricant to the seating surfaces of a cock or plug valve to which the present invention may be applied.

The valve plug may be operated by hand or power through the medium of a worm 12 engaging a worm wheel segment 13 the hub 14 of which is affixed to the stem of the plug. The worm shaft is formed at one end of the worm with a threaded portion engaged by nuts 15 and 16 and with a polygonal extension 17 which is slidably fitted in the correspondingly shaped bore of a driving sleeve or tubular shaft 18 mounted in suitable bearings 19. As shown there are two bearings 19 each comprising a pair of grooved race rings and an interposed series of balls, the two outer race rings being clamped between a pair of housing members 20 and 21 which are bolted to an outer housing 22 in which the member 20 is fitted, said outer housing 22 being supported by a bracket arm 23 formed on the bonnet 4. An external shoulder on the tubular driving shaft 18 is clamped between the two inner race rings, thereby preventing endwise movement of said tubular shaft. Rigidly connected with said tubular shaft 18 is a handwheel 24 and also a driving gear 25. In the specific construction shown, the hub 26 of the hand-wheel is screwed to a stub shaft 27 which is fitted in and keyed with the tubular shaft 18, while the driving gear 25 is fitted on said shaft 18 between the housing member 21 and the hub 26 of the handwheel and made fast with the latter by clutch-type engaging means 28.

The reason for driving the worm through a tubular shaft with which the worm is slidably connected is to permit a limited axial movement of the worm for a purpose presently to be explained. A worm shaft bearing 29 is provided at the opposite end of the worm from that which is connected with the tubular driving shaft. Said bearing 29 is shown as an anti-friction bearing unit the outer race ring of which is suitably secured in a housing member 30 formed on a bracket 31 which is attached to a supporting arm 32 extending from the valve bonnet. The worm shaft is slidably fitted in the inner race ring of said bearing 29. A shoulder 33 on the worm shaft coacts with said bearing to limit endwise movement of the worm to the left, while the nut 16 coacts with the end of the tubular driving shaft 18 to limit endwise movement of the worm to the right. In other words, the excess of the distance between the bearing 29 and the inner end of the tubular shaft 18, over the distance between the shoulder 33 and the end of the nut 16, determines the extent of endwise movement which is permitted for the worm. By replacing the nut 15 with one of less thickness, the distance between 33 and the end of nut 16 may be decreased, thus increasing the permissible endwise movement of the worm as may be required.

Beyond the bearing 29, the worm shaft extension 34 is connected with a pump piston 35 working in the pump cylinder 36. As shown, the worm shaft extension has a swivel connection with said piston. The piston is cup-shaped, and the worm shaft extension constituting the piston rod passes loosely through a central opening in the piston head, and is connected with the piston by means of a pair of antifriction thrust bearing units 37, one of said units being clamped between the piston head and a nut 38 screwed on the threaded tip of the worm shaft extension, the other of said units being clamped between said nut and a threaded member 39 screwed into the piston, thus providing said swivel connection, so that the worm can freely revolve without turning the piston.

The pump cylinder 36 is formed in a tank 40 which is attached to the member 41 of the bracket 31, the cylinder head 42 being clamped between said tank and member 41 and being formed with a stuffing box the packing of which is compressed by the gland 43. In said tank above the pump cylinder is an oil reservoir 44, and in said tank below the cylinder is a separate oil pressure compartment 45 communicating by the flexible conduit 46 with means presently to be described for effecting a force feed of lubricant to the lubricating system of the valve. At both sides of the piston, the pump cylinder is connected with the oil reservoir 44 through passages having inwardly opening check valves 47, and with the compartment 45 through passages having outwardly opening check valves 48. Thus the pump is double acting. As the piston is moved in either direction, oil will be sucked from the reservoir 44 into one end of the cylinder, and will be forced from the other end of the cylinder into the compartment 45.

Said compartment 45 is provided with bottom drain openings closed by screw plugs 49. The oil reservoir 44 has a removable cover 50 secured thereto by swing bolts 51. A float 52 in the oil reservoir has its stem extending through a guide in the cover and functions to indicate the liquid level in the reservoir. When the float descends to the position shown in Fig. 1, an element 53 on the float stem may actuate a mercury switch 54 controlling an electric circuit, which may be either an alarm circuit or a motor circuit as hereinafter explained.

As shown in Fig. 2, a lubricant reservoir 55 in communication with the lubricant passage 8 in the valve plug stem is provided by a tubular member 56 in which is a follower 57 for forcing the lubricant to the valve. Said tubular member is affixed to the enlarged head of a screw plug 58 which is screwed into the upper end of the valve plug stem. The lower end of said tubular member is seated in a groove in the top of said plug. The upper end of said tubular member is closed by a cap 59 having a groove engaging said upper end. The plug 58, tubular member 56 thereon and cap 59 are clamped together by a binding screw 60 carried by a yoke 61 which is pivotally connected to the plug as indicated at 62. The upper and lower ends of said tubular member 56 have rounded edges, and the grooves in the plug 58 and cap 59 are of wedge-shaped cross section, so that when the parts are tightly clamped by tightening the binding screw 60 the joints between said tubular member and the plug 58 and cap 59 are substantially grease tight.

Lubricant is forced to the lubricant-distributing grooves of the plug valve by oil pressure acting on the follower 57. The follower 57 and cap 59 are so formed that even when the follower is in its extreme upper position in contact with the cap a pressure chamber 63 is formed between them. This chamber communicates through the aforesaid conduit 46 with the bottom pressure compartment 45 of the oil tank. The oil pump, compartment 45 and chamber 63 being all filled with oil, it will be apparent that at each operation of the pump the forcing of oil into the compartment 45 will create a pressure which, acting upon the follower 57, will force the follower downward, with accompanying enlargement of the chamber 63.

If the force required to turn the valve plug 1 is greater than that which must be exerted to work the pump piston 35, the worm 12 when operated will climb the worm wheel segment 13 until the worm is shifted longitudinally as far as permitted by its motion-limiting stops, and then on its continued rotation the worm will drive the worm wheel segment and thereby turn the valve plug from open to closed position or vice versa as the case may be. Thus every operation of the worm to turn the valve plug will be accompanied by a working stroke of the double-acting pump piston until such a pressure builds up on the oil in the compartment 45 as to create a greater resistance to the movement of the pump piston than the resistance to the turning movement of the valve plug.

So long as such a pressure is maintained, the worm when operated will drive the worm wheel segment to turn the valve plug without longitudinal shifting of the worm and therefore without operation of the pump. But when this pressure is reduced, as a result of feeding of the lubricant to the valve, the ensuing operation of the worm to turn the valve plug will again be accompanied by a longitudinal shift of the worm and operation of the pump, restoring the said pressure. Thus the lubricant in the reservoir 55 will be maintained under a substantially constant pressure for forcing the lubricant to the seating surfaces of the valve plug and its casing, and every operation of the valve will be preceded by a forced feed of lubricant to the valve if required. If the valve plug after being a long time in either open or closed position should stick on account of need of lubricant, its resistance to turning will cause the worm when operated to shift and work the pump preceding the driving of the worm wheel segment to turn the plug, thus forcing lubricant between the seating surfaces of the valve plug and the casing as required.

As shown in Fig. 3, an electric motor 64 may be employed for operating the valve plug by power. The casing of this motor is attached to a bracket 65 extending from the valve bonnet. The gear 25 on the tubular shaft 18 is represented as a bevel gear engaged by a bevel pinion 66 on the motor shaft. The operating circuit of the motor (not shown) may be of the three-way type controlled by a main switch for starting the motor and by limit switches for stopping the motor as the valve reaches open or closed position. This is a well known type of motor circuit, examples of which are disclosed in my issued patents including Beck- with 1,529,005 of March 10, 1925.

The previously mentioned switch 54, which is actuated by the float 52 when the oil in the reservoir 44 reaches a low level, may control a relay circuit (not shown) for actuating an alarm, or it may control the motor circuit for breaking said circuit when said low oil level is reached. At about the time the float 52 actuates said switch 54, the follower 57 in the lubricant reservoir 55 will be nearly or substantially at its lowest position, or in other words the lubricant reservoir will need replenishing at about the same time that the oil reservoir needs replenishing. When this condition is reached, the binding screw 60 may be loosened and the yoke 61 carrying said screw may be swung out of the way to release the cap 59 which may then be removed from the upper end of the tubular member 56. Said member having the follower 57 in its bottom and being filled with oil may be removed from the valve, and the oil may be poured therefrom back into the oil reservoir 44. The tubular member may then be filled with grease and placed in inverted position on the valve and secured as shown in Fig. 2, and the apparatus is again ready for use. Thus the tubular member 56 with its follower 57 constitutes an invertible element which may be used either end up, so that the grease may be backed into either end and so that it will function as a removable oil receptacle from which the oil can be poured back into the oil reservoir 44.

It will be understood that the illustrative apparatus may be variously modified in details of construction and arrangement to suit various conditions or requirements; moreover it is not indispensable that all of the features of the invention be used conjointly, since different features may be advantageously used in various different combinations and sub-combinations.

What I claim as my invention, and desire to secure by Letters Patent, is:

1. A plug valve having a lubricating system, means operable to turn the valve plug, pumping means operable by said first-named means, and means operable by said pumping means, to apply pressure on the lubricant in said system, whereby the operation of the plug to open or close the valve is accompanied by a forced feed of lubricant to the seating surfaces of the plug and its casing.

2. A plug valve having a lubricating system, means operable to turn the valve plug, pumping means operable by said first-named means before it turns the plug, and means operable by said pumping means to apply pressure on the lubricant in said system, whereby to force a feed of lubricant to the seating surfaces of the plug and its casing immediately preceding the plug-turning operation.

3. A plug valve having a lubricating system, means operable to turn the valve plug including a member capable of a limited independent movement when a sufficient resistance to plug-turning operation is encountered to cause such movement, a pump operable by such movement of said member, a pressure chamber into which liquid is forced by said pump, and means operable by pressure in said chamber to apply pressure on the lubricant in said system whereby to force a feed of lubricant to the seating surfaces of the plug and its casing, said independent movement of said member being dependent upon a greater resistance to the operation of the plug than the resistance to the operation of said last named means.

4. A plug valve having a lubricating system, means operable by fluid pressure to force a feed of lubricant to said system, a pump operable to produce such fluid pressure on said means, and means operable to turn the plug including operatively connected members one having a lost motion capability relative to another, said pumping being operable by said one member before it becomes effective to transmit turning motion when the resistance to such turning motion exceeds the resistance to operation of said pump.

5. A plug valve having a lubricating system including a lubricant reservoir, a slidable follower in said reservoir operable by fluid pressure to apply pressure on the lubricant, an operating means, pumping means operable thereby for creating said fluid pressure to operate said follower, and means operable by said operating means to turn the valve plug.

6. A plug valve having a lubricating system including a lubricant reservoir contractible in interior volume to force a feed of lubricant to the seating surfaces of the valve plug and its casing, means whereby such contraction can be effected by application of fluid pressure, an operating means, pumping means operable thereby for producing the fluid pressure to be applied, and means operable by said operating means to turn the plug.

7. In an apparatus for operating and forcing a feed of lubricant to means to be operated, the combination with said means and its lubricating system, of means operable to apply pressure on the lubricant in said system, said second-named means including a pressure chamber and a pump for forcing liquid in said chamber, and mechanism for operating said first-named means including a member capable of a limited independent movement operatively connected with said pump, the construction and arrangement being such that if the resistance to the operation of said first-named means is greater than the resistance to the operation of said pump the said mechanism will operate the latter before operating the former and thereby cause a forced feed of lubricant to said first-named means, said independent movement of said member being dependent upon such relation of resistances.

8. In an apparatus for operating and effecting automatic lubrication of a means to be operated, the combination with said means and its lubricating system, of mechanism for operating said means comprising a worm and worm gear element to be driven thereby, said worm being capable of a limited longitudinal movement, and means operable by said worm in its longitudinal movement for forcing a feed of lubricant to said system.

9. In an apparatus for operating and effecting automatic lubrication of a means to be operated, the combination with said means and a lubricating system therefor including a lubricant reservoir having a follower operable to apply pressure on the lubricant, of a double-acting pump, a liquid reservoir from which the pump draws liquid at each stroke, a liquid pressure chamber into which the pump forces liquid at each stroke, the pressure in said chamber acting on said follower, and mechanism for operating said first-named means including means to operate said pump.

10. In an apparatus for operating and effecting automatic lubrication of a means to be operated, the combination with said means and a lubricating system therefor including a lubricant reservoir having a follower operable to apply pressure on the lubricant, of means providing a chamber whereby fluid pressure can be applied on said follower, means for operating said first-named means including a worm capable of a limited longitudinal movement, and pumping means operable by the worm in its longitudinal movement for forcing fluid into said chamber.

11. An apparatus of the character set forth in claim 10 wherein the lubricant reservoir is removable and invertible substantially as and for the purpose described.

12. An apparatus of the character set forth in claim 10 wherein the lubricant reservoir is removable and invertible, said reservoir comprising a tubular member having said follower therein and a cap on the upper end of said member and a yoke attached to the part of the apparatus on which said tubular member is mounted having a binding screw engaging said cap, the said pressure chamber being between said cap and follower.

13. In an apparatus for operating and effecting automatic lubrication of a means to be operated, the combination with said means and the lubricating system including a lubricant reservoir, of mechanism for operating said means, means operable by said mechanism for applying pressure on the lubricant in said system, a motor for operating said mechanism, and means for rendering the motor inoperative when the lubricant reservoir requires replenishing.

14. In an apparatus for operating and effecting automatic lubrication of a means to be operated, the combination with said means and a lubricating system therefor including a lubricant reservoir having a follower operable to apply pressure on the lubricant, of mechanism to operate said means comprising a shaft and gearing driven thereby including a gear element in fixed relation to said means to be operated, and means operable by a part of said mechanism for operating said follower.

15. In an apparatus for operating and effecting automatic lubrication of a means to be operated, the combination with said means and a lubricating system therefor including a lubricant reservoir having a follower operable to apply pressure on the lubricant, of mechanism to operate said means comprising a shaft and gearing driven thereby, said mechanism including an element axially displaceable as a result of resistance to the operation of said means in excess of the resistance to displacement of said element, such displacement being limited, and means operable by displacement of said element for operating said follower.

16. In an apparatus for operating and effecting automatic lubrication of a means to be operated, the combination with said means and a lubricating system therefor including a lubricant reservoir having a follower operable to apply pressure on the lubricant, of mechanism to operate said means comprising a shaft and gearing driven thereby including a gear element in fixed relation to said means to be operated, said mechanism including an element displaceable as a result of resistance to the operation of said means in excess of the resistance to displacement of said displaceable element, such displacement being limited, means providing a chamber whereby fluid pressure can be applied on said follower, and a pump operable by said displacement of said displaceable element for forcing fluid into said chamber.

17. A device of the class described comprising, in combination, a plug valve having duct means for introducing lubricant between the seating surfaces of the valve plug and its casing, a lubricant reservoir in communication with said duct means, a follower in said reservoir operable to apply pressure on the lubricant, mechanism for turning the plug comprising a shaft and gearing driven thereby, said mechanism including an element axially displaceable as a result of resistance to the operation of said means in excess of the resistance to displacement of said element, such displacement being limited, and means operable by displacement of said element to operate said follower.

18. A device of the class described comprising, in combination, a plug valve having duct means for introducing lubricant between the seating surfaces of the valve plug and its casing, a lubricant reservoir in communication with said duct means, a follower in said reservoir operable to apply pressure on the lubricant, means providing a chamber whereby fluid pressure can be applied on the follower, mechanism for turning the valve plug comprising a shaft and gearing driven thereby, including a gear element in operative relation to said plug, said mechanism including an element capable of a limited displacement as a result of resistance to the turning of the plug in excess of the resistance to such displacement, and pumping means operable by displacement of said element for forcing fluid into said chamber.

19. A device of the class described comprising, in combination, a plug valve having duct means for introducing lubricant between the seating surfaces of the valve plug and its casing, a lubricant reservoir in communication with said duct means, a follower in said reservoir operable to apply pressure on the lubricant, an operating means including a worm capable of a limited longitudinal movement, means operable by the worm in its longitudinal movement to operate said follower for forcing a feed of lubricant, and a worm gear element engaged by the worm and operatively connected with the valve plug whereby to turn the valve plug by operation of said worm.

20. A device of the class described comprising, in combination, a plug valve having duct means for introducing lubricant between the seating surfaces of the valve plug and its casing, a lubricant reservoir in communication with said duct means, a follower in said reservoir operable to apply pressure on the lubricant, means providing a chamber whereby fluid pressure can be applied on the follower, an operating means including a worm capable of a limited longitudinal movement, pumping means operable by the worm in its longitudinal movement for forcing fluid into said chamber, and a worm gear element operatively connected with the valve plug and engaged by said worm whereby to turn the valve plug by said worm.

21. A valve plug having a lubricating system, means operable to apply pressure on the lubricant in said system, and an operating mechanism to operate said means and to turn the valve plug, said mechanism comprising a shaft, a gear drive connection between the shaft and the valve plug including a gear element in fixed relation to the valve plug, and another operative connection between the shaft and said means.

22. A valve plug having a lubricating system, means operable to apply pressure on the lubricant in said system, and an operating mechanism to operate said means and to turn the valve plug, said mechanism comprising a shaft, a gear drive connection between the shaft and the valve plug including a gear element in fixed relation to the valve plug, and means operable by said shaft to operate said first-named means immediately preceding the plug-turning operation.

23. A plug valve having a lubricating system, means operable to apply pressure on the lubricant in said system, mechanism comprising gearing operable to turn the valve plug, said mechanism including a gear element in fixed relation to the valve plug, and means operable by said mechanism to operate said first-named means.

24. A plug valve having a lubricating system, means operable to apply pressure on the lubricant in said system, and mechanism comprising gearing operable to turn the valve plug, said mechanism including a gear element in fixed relation to the valve plug and embodying a displaceable element operatively connected with said means, said last-named element being displaceable to operate said means under application of power to said mechanism when the resistance to turning of the plug exceeds resistance to the operation of said means.

CLINTON H. BECKWITH.